United States Patent
Cao et al.

(10) Patent No.: US 8,261,558 B2
(45) Date of Patent: Sep. 11, 2012

(54) SELF-ADJUSTING INSULATION, INCLUDING INSULATION PARTICULARLY SUITED FOR PIPE OR DUCT

(75) Inventors: Bangshu Cao, Raleigh, NC (US);
Edouard Lauer, Zebulon, NC (US);
Scott Edwards, Bedford, TX (US)

(73) Assignee: Nomaco Inc., Zebulon, NC (US)

( * ) Notice: Subject to any disclaimer, the term of this patent is extended or adjusted under 35 U.S.C. 154(b) by 170 days.

(21) Appl. No.: 12/823,653

(22) Filed: Jun. 25, 2010

(65) Prior Publication Data

US 2010/0330316 A1 Dec. 30, 2010

Related U.S. Application Data

(60) Provisional application No. 61/269,480, filed on Jun. 25, 2009.

(51) Int. Cl.
*F17C 13/00* (2006.01)
(52) U.S. Cl. ......... 62/50.7; 428/35.6; 138/148; 138/149
(58) Field of Classification Search .................. 428/36.5, 428/316.6; 138/149, 151, 152, 156, 148; 62/50.7
See application file for complete search history.

(56) References Cited

U.S. PATENT DOCUMENTS

| | | | |
|---|---|---|---|
| 1,930,285 A * | 10/1933 | Robinson | 138/143 |
| 2,241,644 A * | 5/1941 | Nichols et al. | 138/152 |
| 2,369,000 A * | 2/1945 | Page | 52/242 |
| 2,835,313 A | 5/1958 | Dodge | |
| 4,036,617 A * | 7/1977 | Leonard et al. | 62/50.7 |
| 4,106,139 A | 8/1978 | Southard | |
| 4,110,857 A | 9/1978 | Banister | |
| 4,134,166 A | 1/1979 | Schuder | |
| 4,143,435 A | 3/1979 | Masuda | |
| 4,348,243 A | 9/1982 | Craubner | |
| 4,394,534 A * | 7/1983 | Bahder et al. | 174/15.5 |
| 4,397,053 A | 8/1983 | Fanti | |
| 4,432,110 A | 2/1984 | Sutton | |

(Continued)

FOREIGN PATENT DOCUMENTS

CN 2137475 Y 7/1993

(Continued)

OTHER PUBLICATIONS

International Search Report for PCT/US2010/040003 mailed Aug. 30, 2010, 10 pages.

(Continued)

*Primary Examiner* — N. Edwards

(74) *Attorney, Agent, or Firm* — Withrow & Terranova, PLLC

(57) ABSTRACT

Embodiments disclosed herein include insulation used to insulate elongated members, such a pipe or duct, as examples. The insulation can address a number of features, including but not limited to expansion and compression of insulation material, expansion and compression of the elongated member insulated, and the ability to adapt the insulation for elongated member of different sizes and lengths. In one embodiment, the insulation is comprised of at least one plank comprised of a flexible polymeric foam configured to be wrapped around an elongated member. In order for the insulation to self-adjust to compensate for thermal expansion and contraction of the foam material, the plank is comprised of a plurality of flexible polymeric foam profiles. At least one flexible polymeric foam spacer may also be provided that self-adjusts to compensate for thermal expansion and contraction of the elongated member to prevent or reduce gaps in insulation.

22 Claims, 18 Drawing Sheets

U.S. PATENT DOCUMENTS

| | | | | |
|---|---|---|---|---|
| 4,524,473 A | | 6/1985 | Fanti | |
| 4,603,445 A | | 8/1986 | Spann | |
| 4,618,517 A | | 10/1986 | Simko, Jr. | |
| 4,620,337 A | | 11/1986 | Williams et al. | |
| 4,700,447 A | | 10/1987 | Spann | |
| 4,713,854 A | | 12/1987 | Graebe | |
| 4,741,058 A | | 5/1988 | Williams et al. | |
| 4,755,408 A | * | 7/1988 | Noel | 428/36.5 |
| 4,781,033 A | * | 11/1988 | Steyert et al. | 62/51.2 |
| 4,796,316 A | | 1/1989 | Boselli | |
| 4,837,060 A | * | 6/1989 | Bambara et al. | 428/36.5 |
| 4,879,776 A | | 11/1989 | Farley | |
| 4,924,679 A | * | 5/1990 | Brigham et al. | 62/50.7 |
| 4,952,450 A | * | 8/1990 | Noel | 428/174 |
| 4,955,096 A | | 9/1990 | Gilroy et al. | |
| 4,972,535 A | | 11/1990 | Goldman | |
| 5,022,111 A | | 6/1991 | Fenner, Sr. | |
| 5,038,433 A | | 8/1991 | Farley | |
| 5,070,560 A | | 12/1991 | Wilkinson | |
| 5,083,335 A | | 1/1992 | Krouskop et al. | |
| 5,118,555 A | * | 6/1992 | Horovitz | 428/178 |
| 5,136,740 A | | 8/1992 | Kraft | |
| 5,138,730 A | | 8/1992 | Masuda | |
| 5,274,846 A | | 1/1994 | Kolsky | |
| 5,327,597 A | | 7/1994 | Rothbard | |
| 5,488,746 A | | 2/1996 | Hudson | |
| 5,491,852 A | | 2/1996 | Maucher | |
| 5,643,139 A | | 7/1997 | Stout et al. | |
| 5,987,668 A | | 11/1999 | Ackley | |
| 6,284,346 B1 | | 9/2001 | Sheridan | |
| 6,306,235 B1 | | 10/2001 | Henderson | |
| 6,425,153 B1 | | 7/2002 | Reswick | |
| 6,866,915 B2 | | 3/2005 | Landvik | |
| 7,093,619 B2 | | 8/2006 | Watanabe et al. | |
| 7,159,620 B2 | | 1/2007 | Kissell | |
| 7,426,767 B2 | | 9/2008 | Mossbeck | |
| 2006/0127648 A1 | | 6/2006 | De Luca | |
| 2006/0194892 A1 | | 8/2006 | Ramesh et al. | |
| 2010/0030316 A1 | * | 2/2010 | Prindle et al. | 623/1.11 |
| 2010/0330316 A1 | * | 12/2010 | Cao et al. | 428/36.5 |

FOREIGN PATENT DOCUMENTS

| | | |
|---|---|---|
| CN | 2302709 Y | 1/1999 |
| CN | 1233444 A | 11/1999 |
| CN | 2432041 Y | 5/2001 |
| CN | 2841067 Y | 11/2006 |
| WO | 95/14136 A1 | 5/1995 |
| WO | 9522922 A1 | 8/1995 |
| WO | 02/075203 A1 | 9/2002 |
| WO | 02/077513 A1 | 10/2002 |
| WO | 2004041659 A2 | 5/2004 |
| WO | 2009014657 A1 | 1/2009 |

OTHER PUBLICATIONS

Non-final Office Action for U.S. Appl. No. 12/893,265 mailed May 15, 2012, 15 pages.

Chinese Office Action for patent application 20102187662.1 mailed Oct. 21, 2010, 3 pages.

* cited by examiner

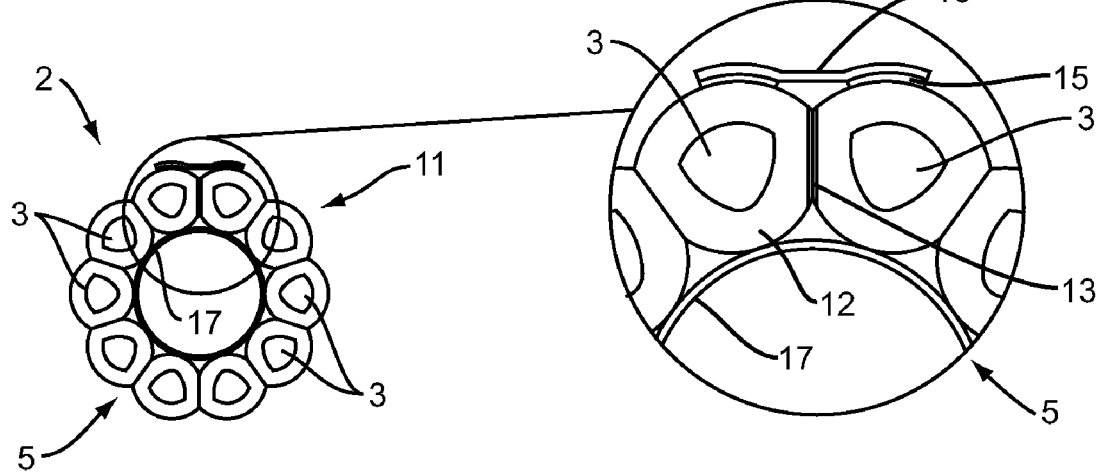
FIG. 3A  FIG. 3B

SELF-ADJUSTING INSULATION, INCLUDING INSULATION PARTICULARLY SUITED FOR PIPE OR DUCT

RELATED APPLICATION

The present application claims priority to U.S. Provisional Patent Application No. 61/269,480 entitled "INSULATION SYSTEM FOR LARGE DIAMETER PIPE OR DUCT," filed on Jun. 25, 2009, which is incorporated herein by reference in its entirety.

FIELD OF THE DISCLOSURE

The technology of the disclosure relates to insulation for an elongated member, such as a pipe or duct, as examples. The insulation may be used for low temperature and cryogenics, as examples.

BACKGROUND

Pipe or duct insulation is used in a variety of applications, such as in residential, industrial and commercial applications. Insulation may be made of inorganic materials like fiberglass, calcium silicate, and mineral wool, as examples. Inorganic type insulation can be used for high temperature applications. Insulation may be made of polymeric foam materials like polyurethane, polyisocyanurate, polystyrene, polyolefin, and synthetic rubber, as examples. Polymeric foam type insulation is commonly used for medium and low temperature applications. Aerogel material has been demonstrated to provide superior insulation properties, but aerogel material is expensive. With the increasing importance of energy efficiency, thick-wall pipe insulation is in high demand.

Polymeric foam insulation can be rigid or flexible. The rigid foam can be put on a destination pipe by either in-situ casting (i.e., spraying foam inside a jacket and letting it cure to solidify) or by assembling pre-formed pieces such as semi-circular-shaped profiles, which are cut from a big foam block/plank. Flexible foam can be a foam sheet (i.e., single-layer or multi-layer, which is produced from an extrusion process and tailored to a specific size to cover a destination pipe) or a foam tube, which is extruded from an annular die and then opened via a slit to allow a pipe to get in. In order to make foam insulation for a pipe with a large outer diameter (OD), be it either a foam sheet or a foam tube, a large-capacity extruder and corresponding large-capacity downstream cooling device can be used, both of which require large capital investment. In addition, high extruder throughput makes uniform cooling of polymer melt and foam more difficult. Therefore, it is highly desirable to manufacture a foam product used for large-diameter pipe insulation without the use of a large extruder.

In addition, thermal contraction of insulation material is also a challenge for pipe insulation, especially for cryogenic applications. For example, for cryogenic applications, the temperature of the insulation may become low during use, although the insulation is normally installed at a higher ambient temperature. The insulation material tends to compress or shrink when its temperature drops, which may lead to separation between insulation sections. The resulting gap can lead to condensation of water vapor inside the insulation or between the insulation and the pipe, causing serious damage to the insulation. Likewise, a pipe or duct can thermally expand along its length which may lead to separation between insulation sections and cause gaps that can lead to condensation of water vapor inside the insulation or between the insulation and the pipe and cause serious damage to the insulation.

Further, polymer insulation materials show higher thermal expansion/contraction coefficient than inorganic insulation materials. Among those polymer insulation materials, economic low density polyethylene (LDPE) demonstrates particularly poor thermal contraction. In addition, closed-cell, low-density, flexible polymeric foam shrinks more than rigid or high-density foam. Hence, it would be advantageous to compensate for the thermal contraction of the polymer foam insulation such that no gap (or separation) would develop at joints due to temperature changes. However, large diameter pipe insulation, for example rigid semicircular foam, may require a lot of space to store in a truck or in a warehouse, which makes shipping and storage inefficient. Finding a more efficient method of shipping and storing large diameter pipe insulation is a challenge.

In addition, variations in pipe dimensions can make installation of pipe insulation difficult. Usually, insulation material is sized to fit a pipe's OD. For example, in the case of a pipe joint, for example, the OD changes for a short distance due to either a larger OD adapter sleeve or one end of a pipe being slightly enlarged to overlap another pipe. Thus, the insulation should be changed or varied accordingly. Otherwise, there could be a gap left in the insulation and that gap would be very problematic. For a cryogenic insulation application, a gap may expose the pipe to the outer environment, and thereby allow water vapor to enter through the gap. The water vapor may result in condensation within the insulation or between the insulation and the pipe. This moisture may cause serious damage to the insulation system and require the system to be replaced after several heating-cooling cycles.

A vacuum method is an effective way of insulation in terms of heat conduction. However, the vacuum method is relatively expensive. Air insulation is less efficient than vacuum insulation. Air is a good insulation medium with thermal conductivity about five (5) times less than most plastics and one thousand (1,000) times less than steel. Ideally, air alone would be used as insulation since there is not additional material cost. However, heat transfer takes place not only from thermal conduction but also from convection and radiation. If air is allowed to move freely over a pipe surface, heat transfer from convection would be much more significant than that from conduction. One solution to reduce heat convection from air flow is to get air sealed inside insulation such as in the form of foam (i.e., many air bubbles) or sealed in a hollow profile (i.e., one big bubble).

Embodiments disclosed herein can address some or all of the issues mentioned above, including (1) how to make insulation for large diameter pipes or ducts by using a relatively small extruder, (2) the capability to adapt pipe or duct dimension variations so the insulation installation is easy and insulation would not be too tight or too loose on a pipe, (3) addressing thermal contraction of flexible polymeric foam material, (4) shipping and storing efficiency, and (5) utilizing air as a free insulation medium.

SUMMARY OF THE DETAILED DESCRIPTION

Embodiments disclosed herein include insulation that may be used to insulate an elongated member, such a pipe or duct, as examples. Embodiments disclosed herein provide insulation that can address a number of features disclosed in more detail in the detailed description, including but not limited to expansion and compression of the insulation material, expansion and compression of the elongated member insulated, and/or customizing the length and/or width of the insulation to adapt to different elongated member sizes and lengths. By being able to customize the length and/or width of the insulation, modularity in insulation can be achieved such that, for example, a single size extruder may be employed to produce insulation for a variety of different sizes of elongated members to reduce costs, provide more convenient storage and shipping, and reduce inventory of unique insulation components.

In this regard in certain embodiments disclosed in the detailed description, the insulation is comprised of at least one plank comprised of a flexible polymeric foam. The plank is configured to be bent or wrapped around an elongated member to dispose a first side of the at least one plank proximate to a second side of the at least one plank to create a first end surface and a second end surface to embrace or surround an elongated member. In order for the insulation to compensate for thermal expansion and contraction of the foam material, in certain embodiments, the plank is comprised of a plurality of flexible polymeric foam profiles each having hollow sections or channels disposed therein. In this regard, the flexible polymeric foam profiles are flexible and resilient and can compress to expand the length of the flexible polymeric foam profiles thus increasing the overall inner diameter of the plank when the foam material undergoes compression and/or other distortion as a result of bending of the plank, such as due to thermal compression, in a self-adjusting manner.

At least one fastener can be provided and configured to fasten the first side to the second side to secure the at least one plank in the shape or substantially the shape of the elongated member to insulate the elongated member. One or more adhesives, which may be disposed on sides and/or end surfaces of the plank, can be employed to attach the first side of the plank to the second side of the plank to secure the plank around the elongated member.

By providing the plank comprised of a plurality of flexible polymeric foam profiles, the insulation can be modularized to insulate varying lengths of elongated members. The length of the plank can be controlled to provide modular sections that can be wrapped around elongated members in series to insulate whatever length of the elongated member desired. Also, by providing a plank comprised of a plurality of flexible polymeric foam profiles connected to each other in parallel, the insulation can be modularized and customized for a variety of different sizes and lengths of elongated members from a single size extruder, for example, if desired. The size of the plank can be controlled by the number of flexible polymeric foam profiles attached together to form different size planks to wrap around different diameter elongated members, as desired. In this manner, larger size elongated members may be able to be insulated from insulation produced by a smaller or single size extruder, as an example.

In other embodiments disclosed in the detailed description, the insulation is designed to avoid or eliminate gaps between insulation planks wrapped around an elongated member in series when the elongated member expands or compresses during thermal expansion and compression. In this regard, certain embodiments include insulation for an elongated member that is comprised of at least one plank comprised of a flexible polymeric foam configured to be wrapped around an elongated member to dispose a first side of the at least one plank proximate to a second side of the at least one plank to create a first end surface and a second end surface. At least one flexible polymeric foam spacer is fastened to the first end surface to compensate for thermal expansion and contraction of the elongated member when disposed around the elongated member.

As further non-limiting examples, the insulation in certain embodiments disclosed herein can be configured to be manufactured as a thick-layer insulation for a large diameter elongated member without using a very large capacity foam extruder; thereby, reducing capital investment on production equipment. The insulation can be configured to readily adapt to dimension variations of a large diameter elongated member within a reasonable range to save time on installation. The insulation can be configured to automatically compensate for thermal expansion/contraction such that gap or separation in the insulation is reduced or eliminated to avoid or reduce damage from water condensation inside the insulation, and/or to minimize replacement work. The insulation can be configured to be shipped and stored efficiently, because the insulation is comprised of a plank that can be compactly overlapped as liner planks. The insulation can be configured to utilize free air enclosed inside hollow profiles as additional insulation medium to save material.

Other systems, methods, and/or products according to embodiments will be or become apparent to one with skill in the art upon review of the following drawings, and further description. It is intended that all such additional systems, methods, and/or products be included within this description, be within the scope of the teachings herein, and be protected by the accompanying claims.

BRIEF DESCRIPTION OF THE DRAWINGS

The exemplary embodiments, objects, uses, advantages, and novel features are more clearly understood by reference to the following description taken in connection with the accompanying figures wherein:

FIG. 3A illustrates an end view of the bendable plank of insulation of FIG. 1 in a wrapped state, in accordance with an exemplary embodiment;

FIG. 3B illustrates a partial view of FIG. 3A with specific reference to the circled area in FIG. 3A;

DETAILED DESCRIPTION

Figure 1:
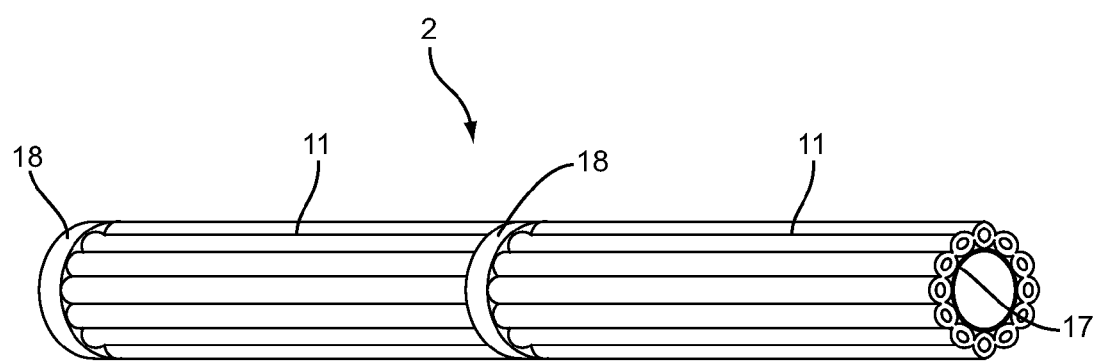
FIG. 1 illustrates a side perspective view of an insulation comprised of two bendable planks of insulation comprised of a plurality of flexible polymeric foam profiles each having a hollow section disposed therein with a foam spacer disposed therebetween, installed on an elongated member in the form of a pipe, in accordance with an exemplary embodiment.

The word "exemplary" is used herein to mean "serving as an example, instance, or illustration." Any configuration or design described herein as "exemplary" is not necessarily to be construed as preferred or advantageous over other configurations or designs. An example is that the materials used for the exemplary embodiments may be made out of man-made materials, natural materials, and combinations thereof. A further example is that the apparatus or components of the apparatus may be manufactured by machine(s), human(s) and combinations thereof.

Certain embodiments will be described more fully hereinafter with reference to the accompanying drawings, in which exemplary embodiments are shown. These embodiments may, however, be embodied in many different forms and should not be construed as limited to the embodiments set forth herein. These embodiments are provided so that this disclosure will be thorough and complete and will fully convey the scope to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Embodiments disclosed herein include insulation that may be used to insulate an elongated member, such a pipe or duct, as examples. Embodiments disclosed herein provide insulation that can address a number of features disclosed in more detail in the detailed description, including but not limited to expansion and compression of the insulation material, expansion and compression of the elongated member insulated, and/or customizing the length and/or width of the insulation to adapt to different elongated member sizes and lengths. By being able to customize the length and/or width of the insulation, modularity in insulation can be achieved such that, for example, a single size extruder may be employed to produce insulation for a variety of different sizes of elongated members to reduce costs, provide more convenient storage and shipping, and reduce inventory of unique insulation components.

In this regard in certain embodiments disclosed in the detailed description, the insulation is comprised of at least one plank comprised of a flexible polymeric foam. The plank is configured to be bent or wrapped around an elongated member to dispose a first side of the at least one plank proximate to a second side of the at least one plank to create a first end surface and a second end surface to embrace or surround an elongated member. In order for the insulation to compensate for thermal expansion and contraction of the foam material, in certain embodiments, the plank is comprised of a plurality of flexible polymeric foam profiles each having hollow sections or channels disposed therein. In this regard, the flexible polymeric foam profiles are flexible and resilient and can compress to expand the length of the flexible polymeric foam profiles thus increasing the overall inner diameter of the plank when the foam material undergoes compression and/or other distortion as a result of bending of the plank, such as due to thermal compression, in a self-adjusting manner.

At least one fastener can be provided and configured to fasten the first side to the second side to secure the at least one plank in the shape or substantially the shape of the elongated member to insulate the elongated member. One or more adhesives, which may be disposed on sides and/or end surfaces of the plank, can be employed to attach the first side of the plank to the second side of the plank to secure the plank around the elongated member.

By providing the plank comprised of a plurality of flexible polymeric foam profiles, the insulation can be modularized to insulate varying lengths of elongated members. The length of the plank can be controlled to provide modular sections that can be wrapped around elongated members in series to insulate whatever length of the elongated member desired. Also, by providing a plank comprised of a plurality of flexible polymeric foam profiles connected to each other in parallel, the insulation can be modularized and customized for a variety of different sizes and lengths of elongated members from a single size extruder, for example, if desired. The size of the plank can be controlled by the number of flexible polymeric foam profiles attached together to form different size planks to wrap around different diameter elongated members, as desired. In this manner, larger size elongated members may be able to be insulated from insulation produced by a smaller or single size extruder, as an example.

In other embodiments disclosed in the detailed description, the insulation is designed to avoid or eliminate gaps between insulation planks wrapped around an elongated member in series when the elongated member expands or compresses during thermal expansion and compression. In this regard, certain embodiments include insulation for an elongated member that is comprised of at least one plank comprised of a flexible polymeric foam configured to be wrapped around an elongated member to dispose a first side of the at least one plank proximate to a second side of the at least one plank to create a first end surface and a second end surface. At least one flexible polymeric foam spacer is fastened to the first end surface to compensate for thermal expansion and contraction of the elongated member when disposed around the elongated member.

In this regard, FIG. 1 illustrates a side view of an insulation 2 installed on an elongated member in the form of a pipe 17 in accordance with some exemplary embodiments. In this embodiment, the insulation 2 is comprised of two planks 11 of insulation installed in series. The planks 11 of insulation are separated by a hollow ring foam spacer 18. As will be discussed in more detail below, the spacer 18 allows the planks 11 to expand and contract along the longitudinal axis of the pipe 17 when the pipe 17 thermally contracts and expands to prevent or reduce gaps between adjacent planks 11 insulating the pipe 17. By providing this arrangement, any number of planks 11 can be wrapped around a pipe or other elongated member in series for any length desired to provide for flexibility in insulating various sizes of elongated members. Spacers 18 can be provided between each plank 11 installed in series to allow the insulation to self-adjust due to compression and expansion of the pipe 17.

The plank 11 and spacer 18 can be formed from any type of polymeric material, including thermoplastic and thermoset materials. Any type of cellular configuration may be provided, including open cell foam, closed cell foam, and bicellular foam (i.e., having both open and closed cells). Non-limiting examples of thermoplastic materials include polypropylene, polypropylene copolymers, polystyrene, polyethylenes, ethylene vinyl acetates (EVAs), polyolefins, including metallocene catalyzed low density polyethylene, thermoplastic olefins (TPOs), thermoplastic polyester, thermoplastic vulcanizates (TPVs), polyvinyl chlorides (PVCs), chlorinated polyethylene, styrene block copolymers, ethylene methyl acrylates (EMAs), ethylene butyl acrylates (EBAs), and the like, and derivatives thereof. Non-limiting examples of thermoset materials include polyurethanes, natural and synthetic rubbers, such as latex, silicones, EPDM, isoprene, chloroprene, neoprene, melamine-formaldehyde, and polyester, and derivatives thereof.

The density of the plank 11 and spacer 18 may be provided to any density desired. These materials can also be made biodegradable and fire retardant through the use of additive master batches. As another example, the thermoset material can be soft or firm depending on formulations and density selections. Further, if the thermoset material selected is a natural material, such as latex for example, it may be considered biodegradable. Further, bacteria, mildew, and mold cannot live in certain thermoset foams.

Figure 2:
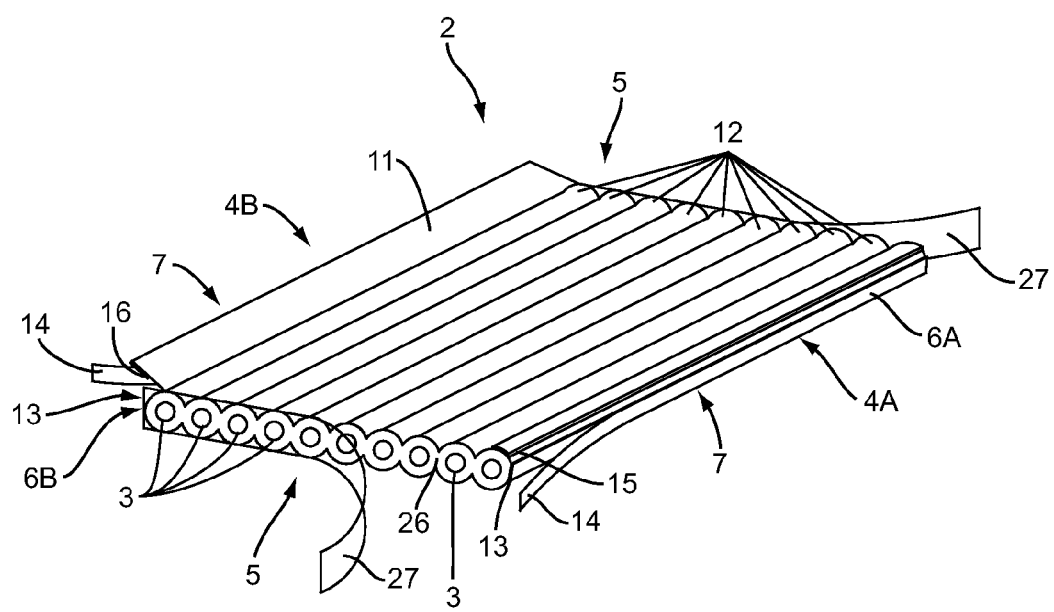
FIG. 2 illustrates a perspective view of a bendable plank of insulation in FIG. 1 in an unwrapped state, in accordance with an exemplary embodiment.

FIG. 2 illustrates a perspective view of a bendable plank 11 of insulation in an unwrapped state in accordance with some exemplary embodiments to provide more detail. In this regard, the plank 11 may be flat or curled in its natural shape before being wrapped around the pipe 17. In this embodiment, the bendable plank 11 of insulation comprises a plurality of hollow flexible polymeric foam profiles or tubes 12, one connected to another in parallel. The profiles 12 may be connected together in any manner desired, such as by adhesive or weld as examples. The profiles or tubes 12 each have a longitudinal axis. The polymeric foam profile or tube 12 is made of a foam material or other resilient and flexible material. The profiles 12 each contain hollow sections 3 in this embodiment that allow the plank 11 to contract and deform under pressure or stress to readily adapt to the shape of an elongated member, such as the pipe 17 in FIG. 1, and forces of bending, and to self-adjust or compensate due to any compression or expansion of the profiles 12 to avoid damaging or tearing the plank 11 and thus compromising the insulation 2.

In this embodiment, the bendable plank 11 of insulation comprises four (4) perimeter sides, two of which are longitudinal sides 4A, 4B that extend along the longitudinal axis of the outermost profiles or tubes 12, and two of which are sides 5 disposed orthogonal to the longitudinal sides 4A, 4B. To wrap the plank 11 around an elongated member, such as the pipe 17 in FIG. 1 for example, to insulate the elongated member, one side 4A is wrapped around the elongated member to the other side 4B such that end surfaces 6A, 6B of the sides 4A, 4B are disposed proximate to each other. At least one fastener 7 is provided in this embodiment and configured to fasten the first side 4A to the second side 4B to secure the plank 11 in the shape or substantially the shape of an elongated member to insulate the elongated member.

In this embodiment, the fastener 7 includes two strips of adhesive layer 13 affixed to two outermost profiles 12, as shown in FIG. 2. The strip of adhesive layer 13 is covered by a strip of liner 14. The strip of liner 14 may be a peel-off strip of liner to protect the strip of adhesive layer 13 until ready for use. The strip of adhesive layer 13 serves as a sealing function to bind, bond, affix, or couple together the outermost profiles or tubes 12 along a plane. The fastener 7 in this embodiment further comprises a pair consisting of fastener strips 15 and a tie strap 16, as shown in FIG. 2, both of which together serve as a primary fastening system. The primary fastening system may comprise a hook and loop fastening system, a Velcro® fastening system, sticky tape, glue, a weld, or other quick release fastening systems or adhesive.

The fastener strips 15 may be configured as female portions of a male/female fastening system with the tie strap 16 serving as a male portion. Each outermost profile or tube 12 includes fastener strips 15 or tie straps 16 affixed longitudinally thereto. The fastener strips 15 and the tie straps 16 are offset approximately ninety (90) degrees with respect to the strip of adhesive layer 13 on the same outermost profile or tube 12. Thus, the two outermost profiles or tubes 12 are fastened, tied or strapped together by the fastening system along a plane and at a location which is offset from the location of the sealing by the strip of adhesive layer 13. The strip of adhesive layer 13 also serves as an assistant fastening function to help the primary fastening system consisting of the fastener strips 15 and the tie straps 16. Alternatively, a sticky tape may be used to achieve the same purpose as the fastener strips 15 and the tie straps 16. A qualified sticky tape type fastener should be able to maintain its integrity (i.e., strength of bonding) over a wide range of temperatures.

Because the foam profile or tube 12 is hollow and is made of flexible polymeric foam, each individual hollow profile in the plank of insulation can self-adjust (i.e., automatically and individually distort) its shape without building up too much stress between adjacent foam profiles. Also, because of the properties of hollow foam profiles, variations in the pipe diameter can be tolerated to a certain degree. This makes the installation of the pipe insulation described herein much easier since it is not necessary to perfectly match the dimensions of the pipe and the foam insulation.

The basic function of the adhesive layer 13 is to seal an insulation gap between two opposite edges of the plank 11 when the plank 11 is wrapped around an elongated member. The secondary function of the adhesive layer 13 is to provide fastening in addition to the primary fastening system consisting of the fastener strips 15 and the tie straps 16. The bendable plank 11 of insulation further comprises an adhesive layer 26 on the end surfaces of each profile or tube 12 and the adhesive layer 26 is covered by a strip of liner 27 as shown in FIG. 2. The strip of liner 27 may be a peel-off strip of liner to protect the adhesive layer 26 until ready for use.

FIGS. 3A and 3B illustrate an end view of the bendable plank of insulation in a wrapped state in accordance with some exemplary embodiments. As illustrated therein, the plank 11 is composed of the foam profiles or tubes 12 and is wrapped around the pipe 17 of FIG. 1. After the strips of liner 14 (FIG. 2) are removed from the adhesive layer 13, two opposite longitudinal edges (e.g., the outermost profiles or tubes 12) of the bendable plank 11 of insulation are bonded together through adhesive layer 13. The fastener strips 15 and the tie straps 16 lock the wrapped state of the insulation 2.

Figure 4A:
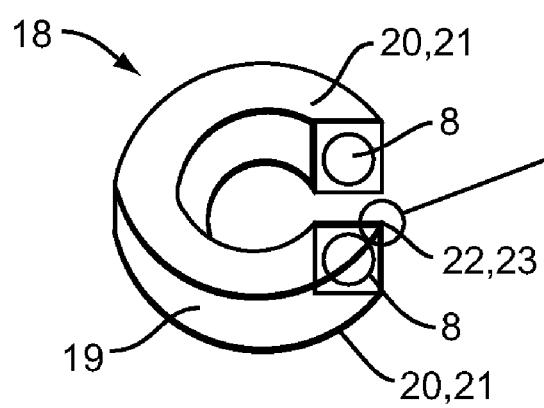
FIG. 4A illustrates a hollow ring foam spacer that may be employed, for example, in the foam spacer provided in FIG. 1, in accordance with an exemplary embodiment.
Figure 4B:
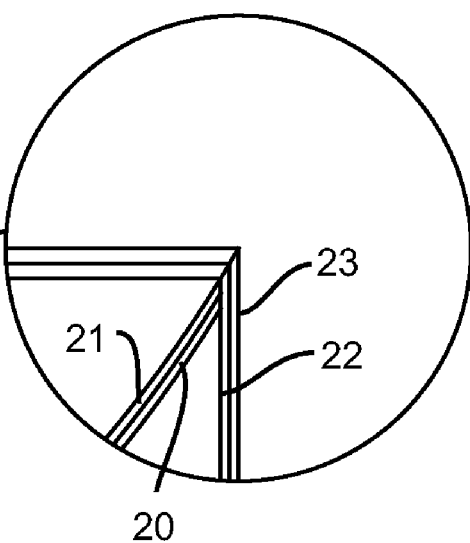
FIG. 4B illustrates a partial view of FIG. 4A with specific reference to the circled area in FIG. 4A.

FIGS. 4A and 4B illustrate the hollow ring foam spacer 18 in accordance with exemplary embodiments. In this embodiment, the spacer 18 has a hollow section 8 disposed therein that allows the spacer 18 to compress and contract about the diameter of the elongated member which the spacer 18 is disposed around. The spacer 18 in this embodiment is a hollow flexible polymeric foam body 19 in a ring shape and with flat front and back faces. An adhesive layer 20 is put on the front and back faces of the spacer 18, and covered by non-stick plastic films or papers 21. The plastic film or paper 21 is removed from the adhesive layer 20 at installation to create a bonding between the spacer 18 and the bendable plank 11 of insulation. As the result, all of air channels of the hollow foam profiles 12 are sealed, and the plank 11 of insulation is integrated section by section with a spacer 18 in between.

With continuing reference to FIGS. 4A and 4B, in this embodiment, the spacer 18 has a ring or donut shape with a gap at one point. An adhesive layer 22 is placed on the cross section area of the gap. The adhesive layer 22 is covered by non-stick plastic films or papers 23 before in use. The gap allows the spacer 18 to be slipped on or over a pipe 17. Once the spacer 18 is on a pipe 17, the non-stick plastic film or paper 23 should be peeled off from the adhesive layer 22 to have the spacer body 19 bonded to itself to form a closed ring. In other words, the gap is closed.

Figure 5:
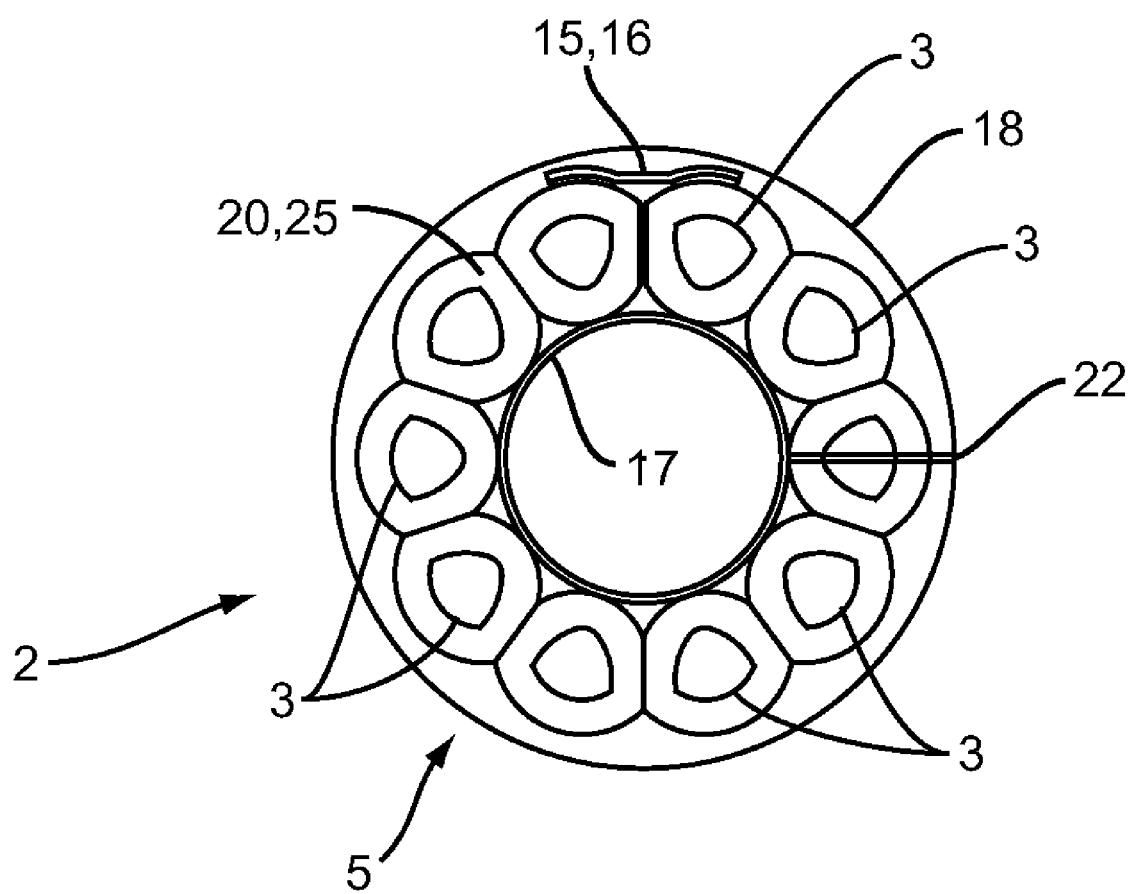
FIG. 5 illustrates a perspective view of a connection between a bendable plank comprised of a plurality of flexible polymeric foam profiles and a hollow ring foam spacer, in accordance with an exemplary embodiment.

FIG. 5 illustrates a perspective view of a connection between the bendable plank 11 and the hollow ring foam spacer 18 in accordance with exemplary embodiments. The adhesive layer 20 on the front and back faces of the spacer 18 is bonded to the adhesive layer 26 on the end surfaces of the profiles or tubes 12.

The hollow ring foam spacer 18 is designed for compensation of thermal contraction or expansion of the insulation 2. It can be found in literature that the linear expansion coefficient of polyurethane is about $6 \times 10^{-5}$ 1/C, polystyrene about $12 \times 10^{-5}$ 1/C, and polyethylene about $30 \times 10^{-5}$ 1/C at room temperature. Assuming temperature changes from 25° C. (room temperature) to −25° C., polyurethane, polystyrene, and polyethylene would approximately shrink 0.3%, 0.6% and 1.5%, respectively. Flexible closed-cell foam may shrink even more due to decreasing air bubble volume in the foam. As an example, polyolefin foam pipe insulation may separate at each joint to leave, on average, one (1) inch gaps every ten (10) feet (ft) along a pipe. In cryogenic application (below −73° C.), shrinkage of plastics or rubber foam insulation may be even worse. As a part of certain embodiments provided herein, the thermal shrinkage issue is resolved by inserting a deformable and recoverable hollow ring foam spacer 18 between pieces of insulation. The hollow ring foam spacer 18 can be squeezed at installation at ambient temperature to accommodate longer length of pipe insulation. As the bendable plank 11 of insulation shrinks longitudinally at low temperatures, the spacer 18 can bounce back to make up the length.

As an alternative to the prefabricated adhesive layers 13 and 26 on the plank 11 as well as the prefabricated adhesive layers 20 and 22 on the spacer 18, fast curing glue or adhesive sealant may be directly applied to the interface between the bendable plank 11 of insulation and the spacer body 19 to replace the adhesive layers 13, 26, 20 and 22, and to eliminate the corresponding non-stick plastic films or papers on the adhesive.

Figure 6:
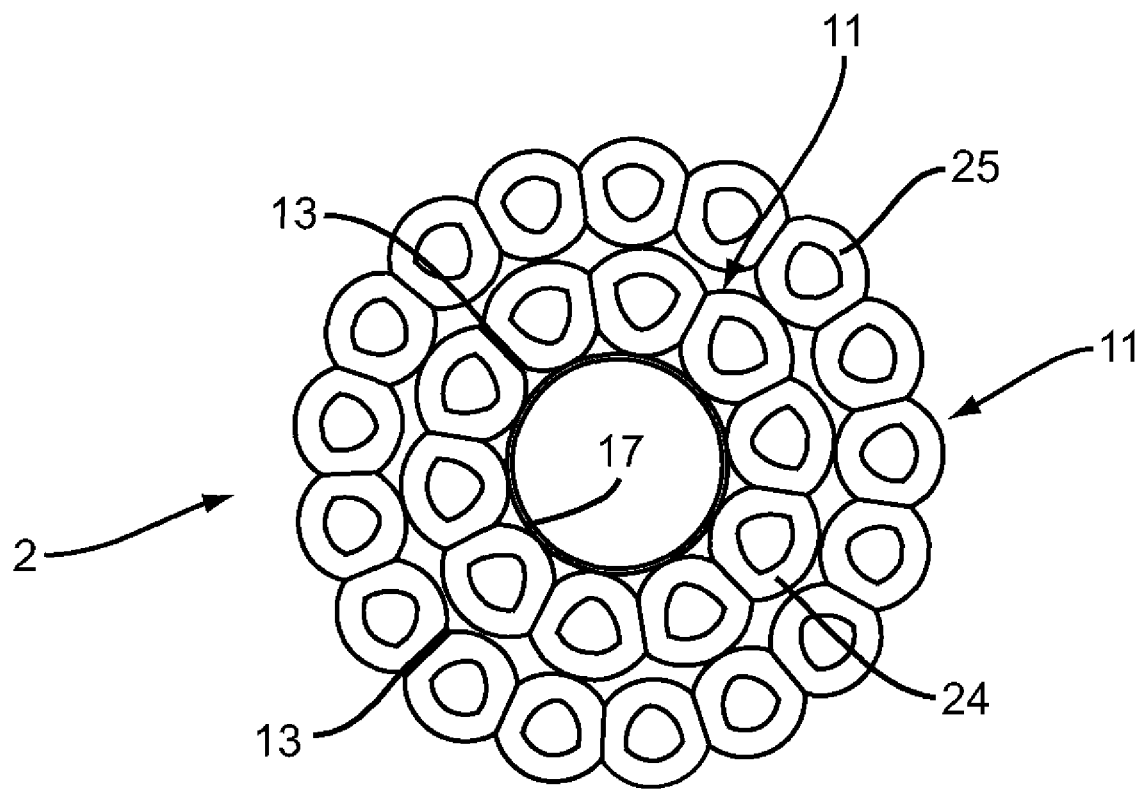
FIG. 6 illustrates an end view of a multilayer insulation comprised of concentric planks comprised of a plurality of flexible polymeric foam profiles, in accordance with an exemplary embodiment.

FIG. 6 illustrates a multilayer insulation in accordance with some exemplary embodiments. A first insulation layer 24 comprised of a first plank and a second insulation layer 25 comprised of a second plank both like or similar to planks 11 in FIGS. 1 and 2 are overlapped on the same section of the pipe 17 or other elongated member. In this manner, additional insulation can be provided wherein planks 11 are disposed around an elongated member concentrically. Because the planks 11 are flexible and can be provided of different sizes, multiple planks 11 can be wrapped concentrically around an elongated member to provide insulation. As illustrated in FIG. 6, the second insulation layer 25 is concentrically wrapped around the first insulation layer 24. The first and second insulation layers 24 and 25 are each comprised of a plank 11 of insulation configured to be bent.

Figure 7:
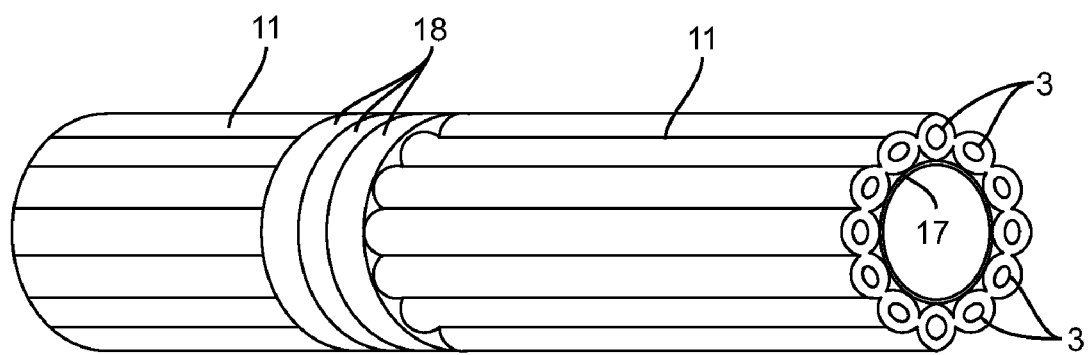
FIG. 7 illustrates a side view of an insulation with multiple hollow ring foam spacers installed on a pipe between planks comprised of a plurality of flexible polymeric foam profiles, in accordance with an exemplary embodiment.

FIG. 7 illustrates a side view of the insulation 2 in FIGS. 1 and 2, but with multiple pieces of hollow ring foam spacers 18 installed on a pipe 17 in accordance with some exemplary embodiments. Since residual length of a pipe to be insulated may not exactly match to whole section length of the plank 11, multiple pieces of spacers 18 can be used to make up the residual length. In this manner, the number of spacers 18 employed can be chosen to be commensurate with the expected ranges of thermal compression and expansion of the elongated member so that gaps are avoided or reduced between adjacent planks.

Figures 8A, 8B:
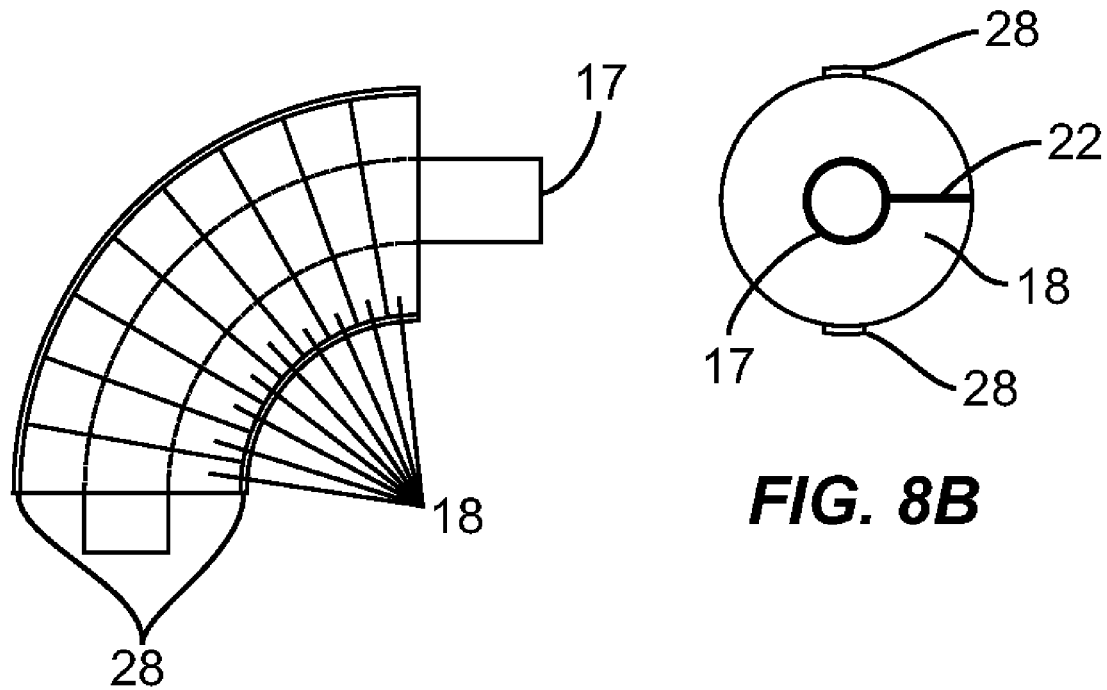
FIG. 8A illustrates a side view of multiple pieces of hollow ring foam spacers overlapped to cover a pipe in a ninety (90) degree turning section, in accordance with an exemplary embodiment.
FIG. 8B illustrates an end view of multiple pieces of hollow ring foam spacers overlapped to cover a ninety (90) degree turning section, in accordance with an exemplary embodiment.

FIG. 8A illustrates a side view of multiple pieces of hollow ring foam spacers 18 overlapped to cover a pipe 17 in a ninety (90) degree turning section in accordance with some exemplary embodiments. Since the hollow ring foam spacer 18 can be compressed unevenly in this embodiment, it can be installed in a section of pipe orientation tuning in any angle. By using one or two or more strips of sticky tape or fasteners 28, the unevenly compressed shape of each hollow ring foam spacer 18 can be held up in the pipe orientation angle change section. FIG. 8B illustrates an end view of multiple pieces of hollow ring foam spacers 18 overlapped to cover a pipe 17 in ninety (90) degree turning section in accordance with some exemplary embodiments.

Figure 9A:
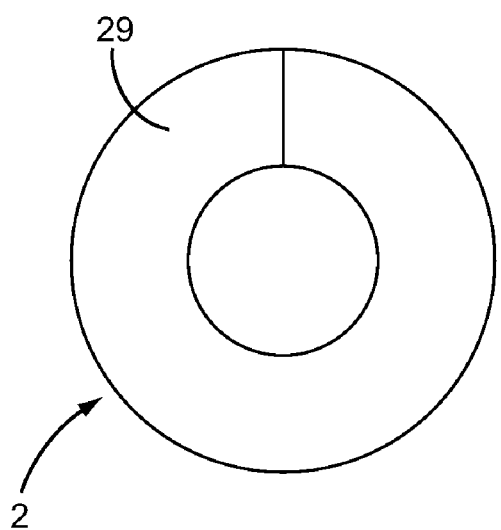
FIG. 9A illustrates a patch or membrane for sealing the end surfaces of foam profiles or tubes that compose plank insulation, in accordance with an exemplary embodiment.
Figure 9B:
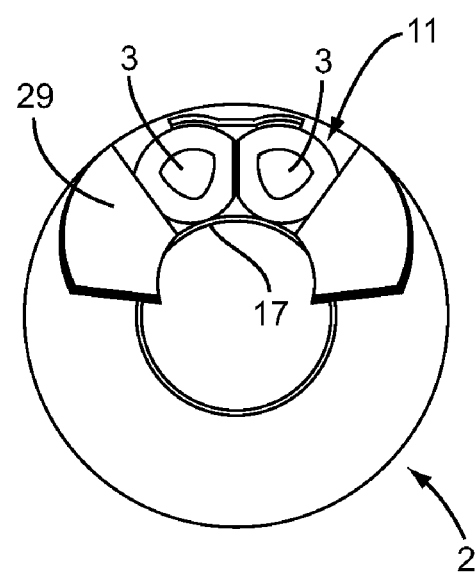
FIG. 9B illustrates an end view of insulation with a patch or membrane for sealing the end surfaces of foam profiles or tubes that compose plank insulation, in accordance with an exemplary embodiment.

FIGS. 9A and 9B illustrate a membrane or patch 29 for sealing off the end surfaces of the hollow sections 3 of the foam profiles or tubes 12 that compose the plank 11 in accordance with some exemplary embodiments. For example, a vacuum or other material may be established inside the hollow sections 3 to provide further insulation properties in the plank 11. In this embodiment, the patch 29 is a piece of plastic film in a ring shape with adhesive layers on both sides. In some cases, such as: (1) pipe temperature is not very low, therefore there is no shrinkage problem of insulation, and (2)

pipe is long and straight without issue of pipe orientation turning, the patch 29 can be used to replace the hollow ring foam spacer 18. FIG. 9B illustrates an end view of the insulation 2 with the patch 29 for sealing the end surfaces of the foam profiles or tubes 12 that comprise the plank 11 in accordance with some exemplary embodiments.

Figure 10:
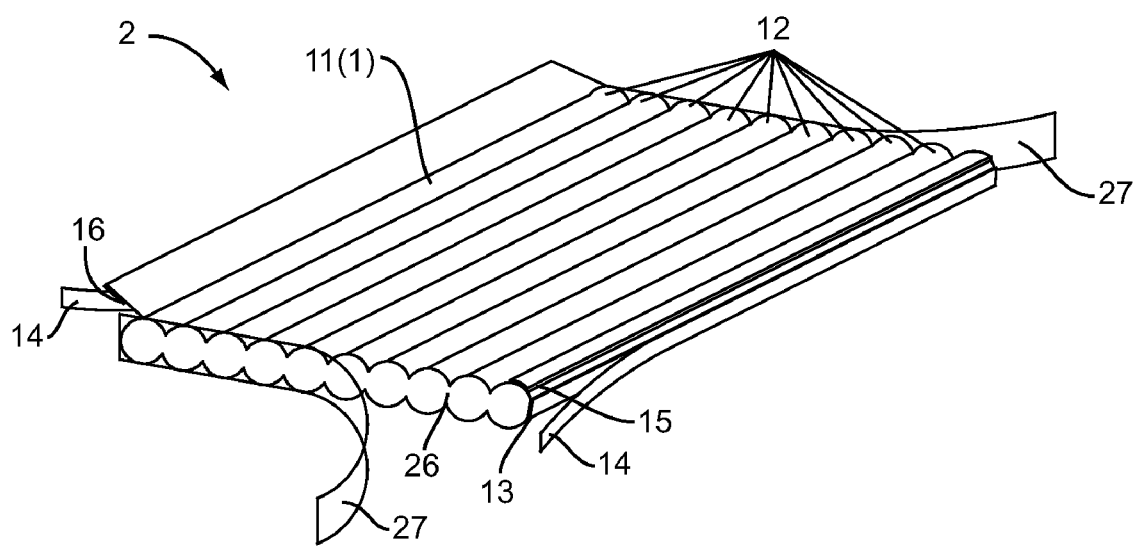
FIG. 10 illustrates an alternate bendable plank of insulation in an unwrapped state of FIG. 2, but without hollow sections disposed in the plurality of flexible polymeric foam profiles, in accordance with an exemplary embodiment.
Figure 11:
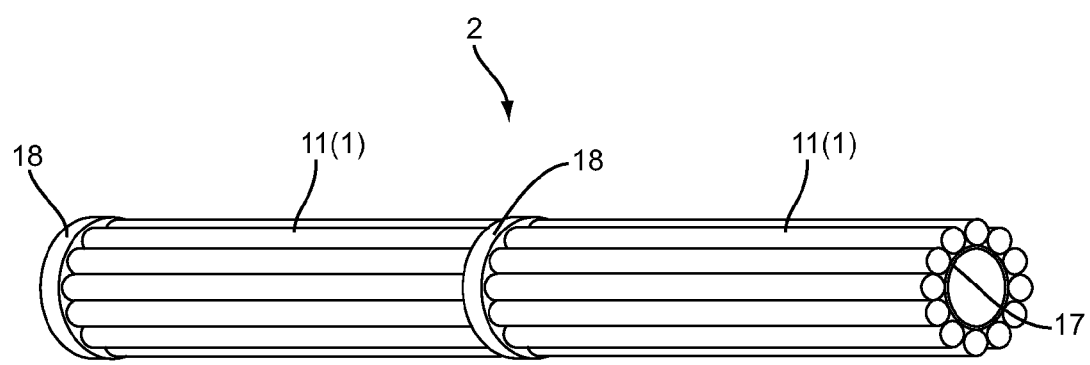
FIG. 11 illustrates a side perspective view of an insulation comprised of two bendable planks of insulation of FIG. 10 with a foam spacer disposed therebetween, installed on an elongated member in the form of a pipe, in accordance with an exemplary embodiment.

Numerous variations and alternatives are possible. For example, the foam used to construct the plank 11 described above may be flexible enough to not require the hollow section 3 to be bent around an elongated member and to expand and compress in response to thermal conditions. In this regard, FIG. 10 illustrates an alternate bendable plank 11(1) of insulation 2 in an unwrapped state of FIG. 2, but without the hollow sections 3 disposed in the plurality of flexible polymeric foam profiles 12, in accordance with an exemplary embodiment. FIG. 11 illustrates a side perspective view of an insulation 2 comprised of two bendable planks 11(1) of insulation of FIG. 10 with the spacer 18 disposed therebetween, installed on the pipe 17, in accordance with an exemplary embodiment. The other features of the plank 11(1) in FIGS. 10 and 11 can be the same as provided in the plank 11, as provided by common element numbers in FIGS. 1 and 2 described above, and thus will not be repeated.

Figure 12:
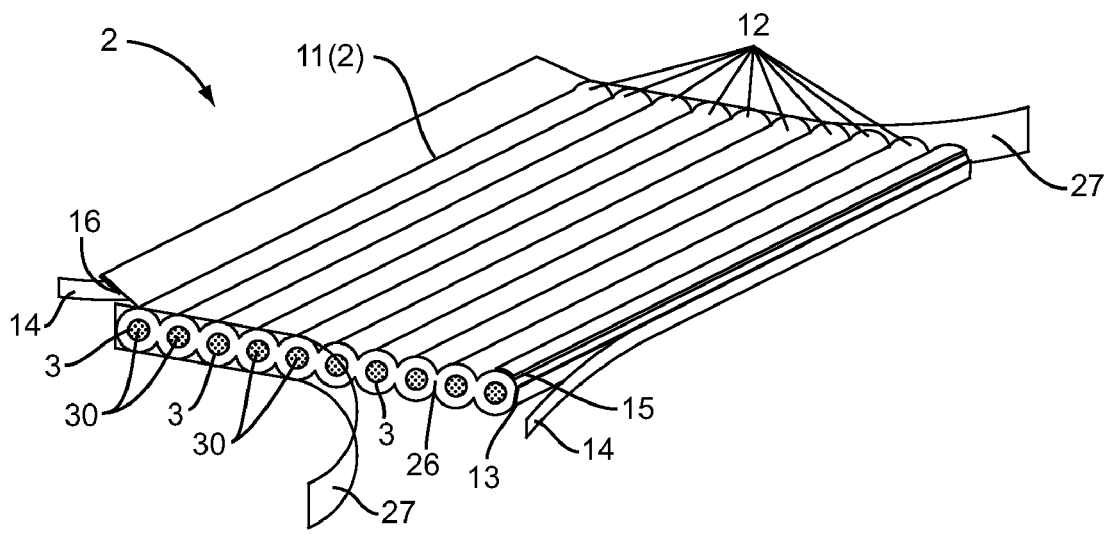
FIG. 12 illustrates an alternate bendable plank of insulation in an unwrapped state of FIG. 2, with filler material disposed in the hollow sections disposed in the plurality of flexible polymeric foam profiles, in accordance with an exemplary embodiment.
Figure 13:
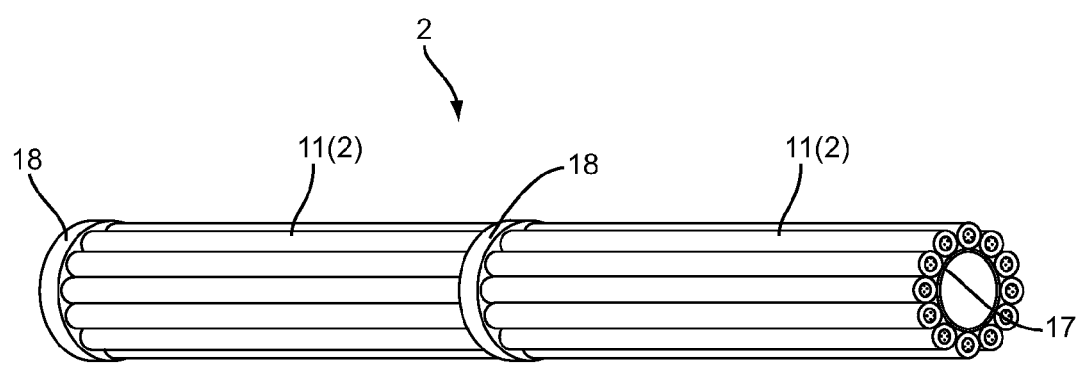
FIG. 13 illustrates a side perspective view of an insulation comprised of two bendable planks of insulation of FIG. 12 with a foam spacer disposed therebetween, installed on an elongated member in the form of a pipe, in accordance with an exemplary embodiment.

A filler material could also be disposed in the hollow sections 3 of the profiles 12 of the plank 11 in FIGS. 1 and 2 to provide flexibility in the plank 11 being able to bend around an elongated member and to expand and compress in response to thermal conditions if insulation other than air is desired to be provided inside the profiles 12. In this regard, FIG. 12 illustrates an alternate bendable plank 11(2) of the insulation 2 in an unwrapped state of FIG. 2, with filler material 30 disposed in the hollow sections 3 disposed in the plurality of flexible polymeric foam profiles 12, in accordance with an exemplary embodiment. The filler material 30 can be any of the materials previously described above as possibilities for the profiles 12 and spacer 18, as examples. FIG. 13 illustrates a side perspective view of the insulation 2 comprised of two bendable planks 11(2) of FIG. 12 with the spacer 18 disposed therebetween, installed on an elongated member in the form of a pipe, in accordance with an exemplary embodiment. The other features of the plank 11(2) in FIGS. 12 and 13 can be the same as provided in the plank 11, as provided by common element numbers in FIGS. 1 and 2 described above, and thus will not be repeated.

Figure 14:
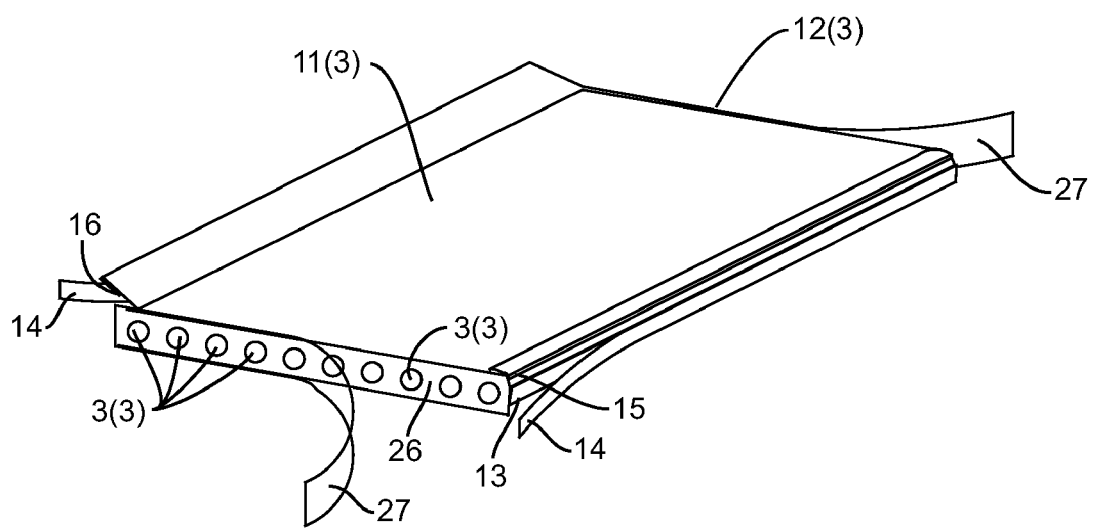
FIG. 14 illustrates an alternate bendable plank of insulation comprised of a single flexible polymeric foam profile with a plurality of hollow sections disposed therein, in accordance with an exemplary embodiment.

The profiles 12 in the plank 11 of FIGS. 1 and 2 do not have to be provided as separate elongated sections attached together, such as through a weld, but could be provided as a single extruded or molded piece. In this regard, FIG. 14 illustrates an alternate bendable plank 11(3) of insulation comprised of a single flexible polymeric foam profile 12(3) with a plurality of hollow sections 3(3) disposed therein, in accordance with an exemplary embodiment. The other features of the plank 11(3) in FIG. 14 can be the same as provided in the plank 11, as provided by common element numbers in FIGS. 1 and 2 described above, and thus will not be repeated.

Figure 15:
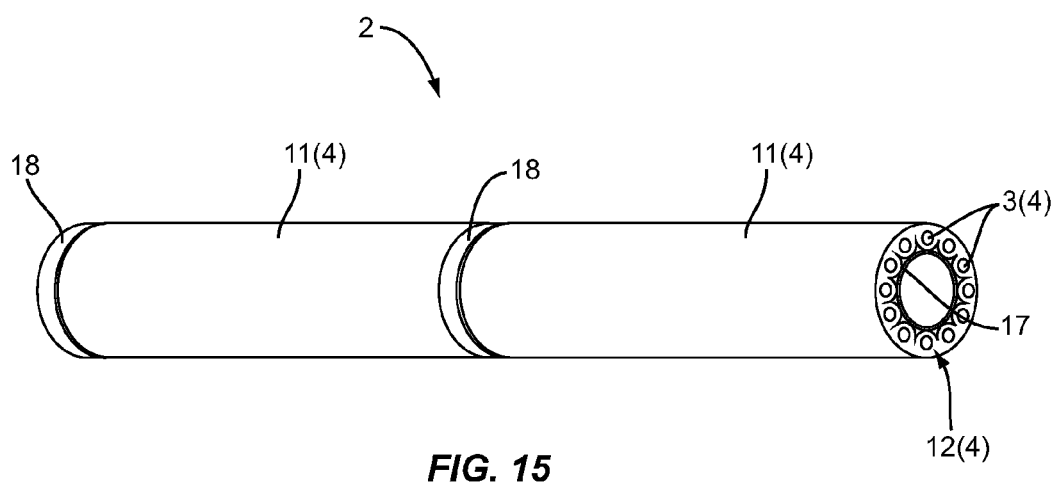
FIG. 15 illustrates a side perspective view of an alternate insulation comprised of two bendable planks of insulation comprised of a plurality of triangular-shaped polymeric foam profiles each having a hollow section disposed therein with a foam spacer disposed therebetween, installed on an elongated member in the form of a pipe, in accordance with an exemplary embodiment.
Figure 16:
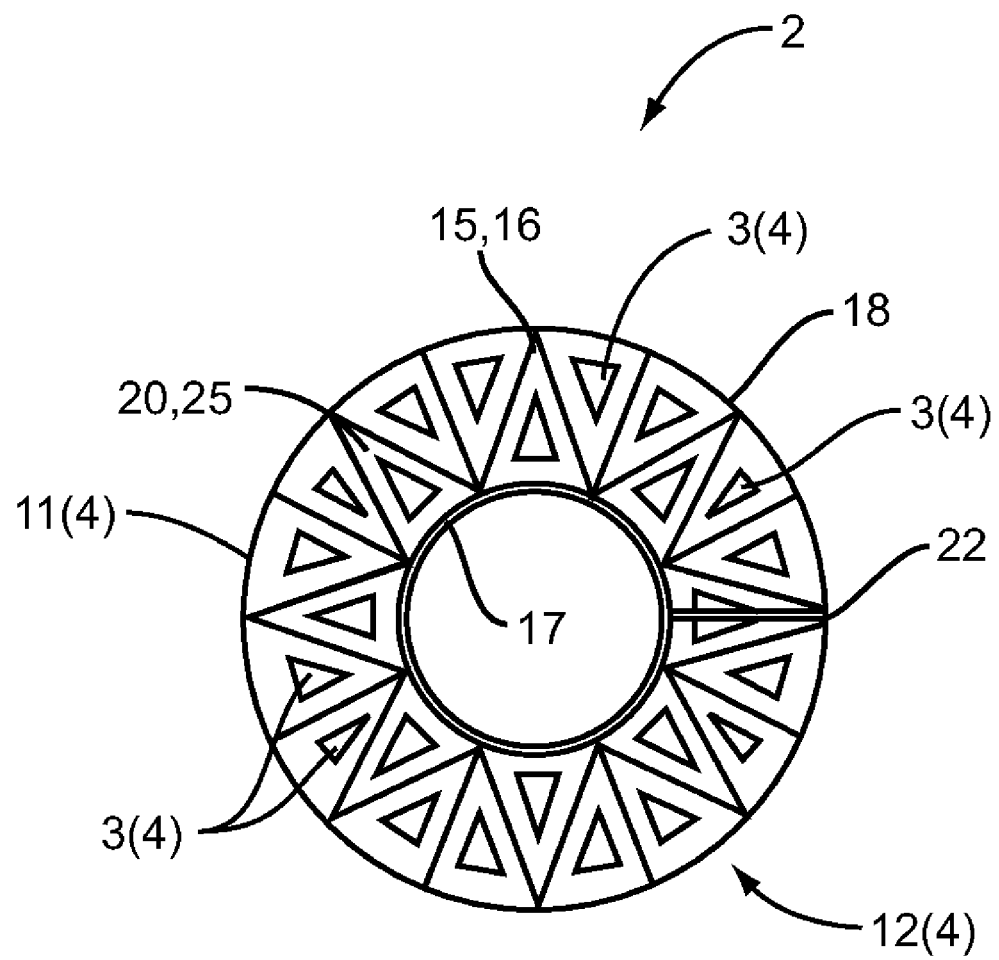
FIG. 16 illustrates a side view of FIG. 15.

Further, the profiles 12 described above to this point have been elliptical or circular-shaped, but such is not required. Other geometries can be provided for profiles disposed in a plank, including but not limited to rectangular, square, triangular, and other polygonal shapes having more than four sides. In this regard, FIG. 15 illustrates a side perspective view of an alternate insulation 2 comprised of two bendable planks 11(4) of insulation having a plurality of triangular-shaped polymeric foam profiles 12(4) disposed therein each having a hollow section 3(4) disposed therein. FIG. 16 illustrates a side view of FIG. 15. The spacer 18 is disposed therebetween and installed on the pipe 17, in accordance with an exemplary embodiment. The other features of the plank 11(4) in FIGS. 15 and 16 can be the same as provided in the plank 11, as provided by common element numbers in FIGS. 1 and 2 described above, and thus will not be repeated.

Figure 17:
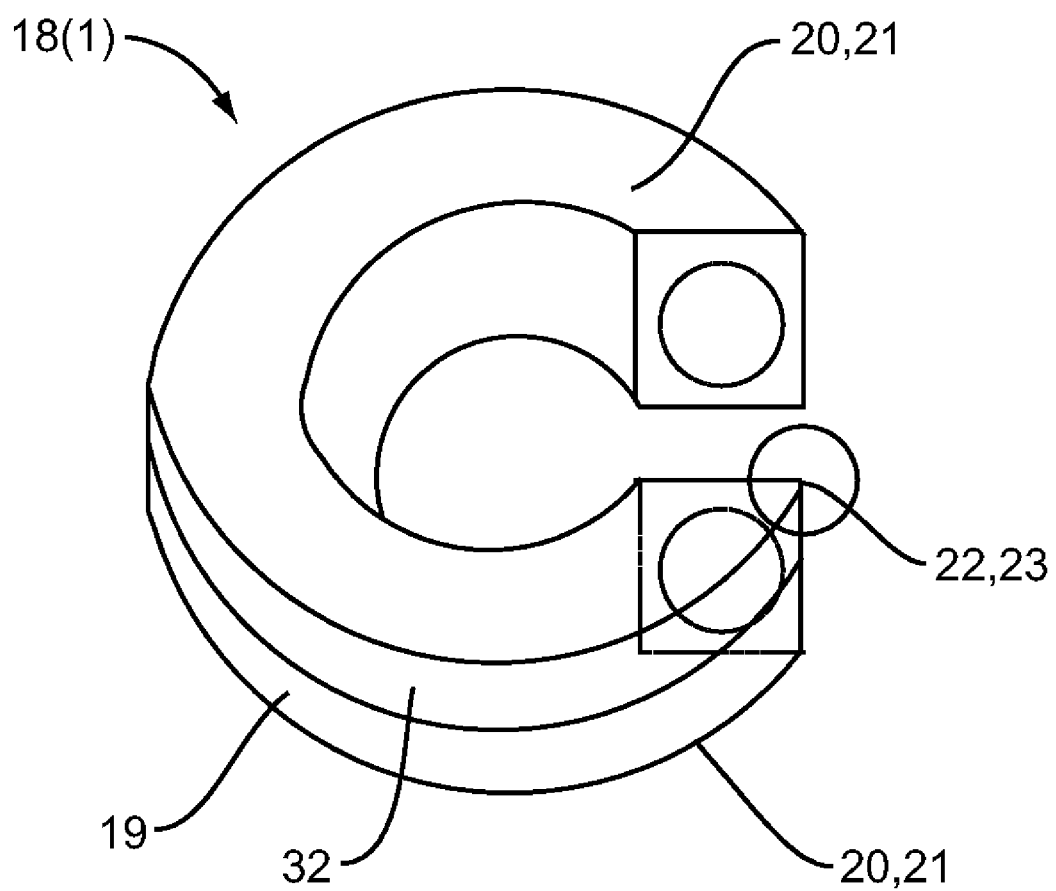
FIG. 17 illustrates the hollow ring foam spacer of FIG. 4A with a expansion joint disposed therein.
Figure 18:
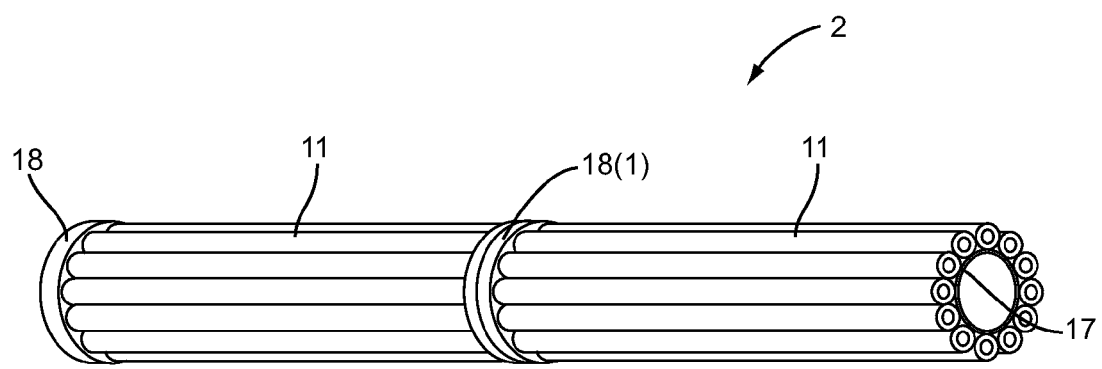
FIG. 18 illustrates the two bendable planks of insulation of FIG. 1 employing the foam spacer of FIG. 17, installed on an elongated member in the form of a pipe, in accordance with an exemplary embodiment.

Further, alternative embodiments of the spacer 18 are also possible. For example, it may be desired to provide for the spacer 18 to thermally contract and expand about a joint to provide increased flexibility. In this regard, FIG. 17 illustrates the hollow ring foam spacer 18(1) like that of the spacer 18 in FIG. 4A, but with an expansion joint 32 disposed therein. FIG. 18 illustrates the two bendable planks 11 of insulation of FIGS. 1 and 2 employing the spacer 18(1) of FIG. 17, installed on a pipe 17, in accordance with an exemplary embodiment. The other features of the spacer 18(1) in FIGS. 17 and 18 can be the same as provided in the spacer 18, as provided by common element numbers in FIGS. 4A and 4B described above, and thus will not be repeated.

While the embodiments disclosed herein have been described with respect to various features, aspects, and embodiments, those skilled and unskilled in the art will recognize that these various features, aspects, and embodiments are not limiting. Other variations, modifications, and alternative embodiments may be made without departing from the spirit and scope.

For example, in view of the foregoing description, it should be noted that the insulation described herein can be used with pipe of a variety of diameters equal to or greater than three inches (3"), as an example. The embodiments disclosed herein can be advantageous for insulating large diameter pipes or ducts, for example, using a small and/or single size extruder. In view of the foregoing description, the adhesive layer may include pressure sensitive adhesive (PSA) or a two-component (A-B) glue. In view of the foregoing description, the hollow flexible foam profile 12 can be round (i.e., tube), but can be in elliptical, square, triangular, or other shapes. In accordance with some exemplary embodiments, the insulation can be applied to square or other shape duct. In view of the foregoing description, the hollow foam profile of the plank insulation in the embodiments disclosed herein can be made, for example, from polymeric materials with glass transition temperature (Tg) below room temperature (25° C.).

In view of the foregoing description, the foam that is used to build the insulation in the embodiments disclosed herein can have, for example, a density in a range from ten (10) kilograms per cubic meter (kg/m$^3$) to 50 kg/m$^3$ and has cell size in a range from 0.1 millimeters (mm) to 5 mm, as an example. In view of the foregoing description, the insulation may include a jacket which is made of aluminum, PVC, or other materials. The jacket can protect the insulation or parts thereof. In view of the foregoing description, the plank insulation is made by thermal welding, piece by piece in parallel. The number of the profiles can be any, depending on the diameter of the pipe to be insulated.

In accordance with some exemplary embodiments, one piece of plank insulation is connected to another piece of plank of insulation by butt-to-butt gluing, thermal welding, or other methods to increase the length of the insulation.

What is claimed is:
1. Insulation for an elongated member, comprised of:
    at least one plank comprised of a flexible polymeric foam configured to be disposed around an elongated member to dispose a first side of the at least one plank proximate to a second side of the at least one plank to create a first end surface and a second end surface; and
    at least one flexible polymeric foam spacer fastened to the first end surface to compensate for thermal expansion and contraction of the elongated member when disposed around the elongated member.

2. The insulation of claim 1, further comprising at least one second flexible polymeric foam spacer fastened to the second end surface to compensate for thermal expansion and contraction of the at least one plank.

3. The insulation of claim 1, wherein the least one flexible polymeric foam spacer is comprised of a plurality of flexible polymeric foam spacers secured to one another in parallel.

4. The insulation of claim 1, wherein the at least one flexible polymeric foam spacer includes a flat surface end to cover and block the hollow sections.

5. The insulation of claim 1, further comprising a glue, adhesive, or weld fastening the at least one flexible polymeric foam spacer to the first end surface.

6. The insulation of claim 1, further comprising at least one expansion joint disposed in the at least one flexible polymeric foam spacer.

7. The insulation of claim 1, wherein the at least one flexible polymeric foam spacer is comprised of a foamed material from a group consisting of polypropylene, polypropylene copolymer, polystyrene, polyethylene, ethylene vinyl acetate (EVA), polyolefin, including metallocene catalyzed low density polyethylene, thermoplastic olefin (TPO), thermoplastic polyester, thermoplastic vulcanizates (TPVs), polyvinyl chlorides (PVCs), chlorinated polyethylene, styrene block copolymers, ethylene methyl acrylates (EMAs), ethylene butyl acrylates (EBAs), polyurethane, natural rubber, synthetic rubber, latex, silicone, EPDM, isoprene, chloroprene, neoprene, melamine-formaldehyde, and polyester.

8. The insulation of claim 1, further comprising at least one fastener configured to fasten the first side to the second side to secure the at least one plank in the shape or substantially the shape of the elongated member to insulate the elongated member.

9. The insulation of claim 8 wherein the at least one fastener comprises a first adhesive layer attached to the first side of the at least one plank configured to be fastened to the second side of the at least one plank.

10. The insulation of claim 9, wherein the at least one fastener further comprises a second adhesive layer attached to the second side of the at least one plank configured to be fastened to the first adhesive layer.

11. The insulation of claim 8, wherein the at least one fastener is disposed between the first end surface and the second end surface.

12. The insulation of claim 8, wherein the at least one fastener is comprised of a first fastener disposed on the first side orthogonal or substantially orthogonal to the first end surface.

13. The insulation of claim 12, wherein the at least one fastener further comprises a second fastener disposed on the second side orthogonal or substantially orthogonal to the second end surface.

14. The insulation of claim 13, further comprising a fastener strip secured to the first fastener and the second fastener.

15. The insulation of claim 1, wherein the at least one plank is comprised of a plurality of flexible polymeric foam profiles.

16. The insulation of claim 15, wherein the plurality of flexible polymeric foam profiles are comprised from the group consisting of a plurality of flexible polymeric hollow foam profiles, a plurality of flexible polymeric solid foam profiles, and a plurality of flexible polymeric hollow foam profiles with filler material disposed in the plurality of flexible polymeric hollow foam profiles.

17. The insulation of claim 1, wherein the at least one plank is comprised of a single polymeric foam profile.

18. The insulation of claim 1, wherein the at least one flexible polymeric foam spacer is configured to be squeezed at ambient temperature during installation between one of the at least one plank and another of the at least one plank.

19. The insulation of claim 1, wherein the at least one flexible polymeric foam spacer includes a hollow section disposed therein.

20. The insulation of claim 19, wherein the hollow section is configured to be disposed along a circumference of the elongated member.

21. The insulation of claim 1, wherein the at least one plank comprises thermoplastic foamed material and the at least one flexible polymeric spacer comprises a thermoset foamed material.

22. The insulation of claim 1, wherein the elongated member is one of a pipe or duct.

* * * * *